United States Patent [19]

Masologites

[11] 4,051,014
[45] Sept. 27, 1977

[54] PROCESS FOR TREATING SULFUR-CONTAINING HYDROCARBON FEEDSTOCKS TO PRODUCE HIGH YIELD COKE

[75] Inventor: George P. Masologites, Olympia Fields, Ill.

[73] Assignee: Atlantic Richfield Company, Philadelphia, Pa.

[21] Appl. No.: 500,439

[22] Filed: Aug. 26, 1974

Related U.S. Application Data

[63] Continuation-in-part of Ser. No. 318,250, Dec. 26, 1972, abandoned.

[51] Int. Cl.$^2$ .............................................. C10G 34/00
[52] U.S. Cl. ..................................... 208/88; 208/127; 208/131; 208/243; 208/249; 201/17
[58] Field of Search .................... 201/17, 20, 21; 208/208 R, 211, 243, 249, 3, 4, 5, 6, 7, 88, 127, 131, 50; 423/525, 527; 252/467, 469

[56] References Cited

U.S. PATENT DOCUMENTS

| | | | |
|---|---|---|---|
| 3,434,975 | 3/1969 | Sheng et al. | 252/467 |
| 3,565,793 | 2/1971 | Herbstman et al. | 208/208 |
| 3,702,816 | 11/1972 | Buchmann et al. | 201/17 |
| 3,719,589 | 3/1973 | Herbstman et al. | 208/208 |

*Primary Examiner*—Wilbur L. Bascomb, Jr.
*Attorney, Agent, or Firm*—John B. Goodman; Frank J. Uxa

[57] ABSTRACT

A process for producing coke from sulfur-containing hydrocarbon feedstocks which involves contacting at least a portion of the feedstock with a peroxy oxidant in the presence of a metal-containing catalyst to preferentially oxidize a portion of the hydrocarbon feedstock, subjecting the feedstock to coking conditions to form coke and recovering a coke product. The present process can provide improved yields of coke having substantially reduced sulfur content.

11 Claims, No Drawings

PROCESS FOR TREATING SULFUR-CONTAINING HYDROCARBON FEEDSTOCKS TO PRODUCE HIGH YIELD COKE

This application is a continuation-in-part of application Ser. No. 318,250, filed Dec. 26, 1972, now abandoned.

This invention relates to a process for producing coke and more particularly to a process for producing improved yields of coke having substantially reduced sulfur content.

The production of coke, for example, from petroleum sources, has become an increasingly important processing area. The manufacture of coke enables efficient use of many of the less desirable petroleum fractions, e.g., residua. In addition, the demand for coke is continually increasing and quality specifications for coke are becoming more rigid. One of the quality specifications which is of particular importance is the sulfur content of coke. In many instances, coke is combusted and the sulfur contained in the coke is often liberated as sulfur oxides which are noxious, corrosive and, therefore, present a serious problem with respect to pollution of the atmosphere. Thus, it is desirable to reduce the sulfur content of coke. One process for producing coke is disclosed in U.S. Pat. No. 3,702,816. However, in order to achieve substantial desulfurization of the coke product, this reference indicates that the coke product must be treated at severe conditions, e.g., temperatures from 1200° F. to 1600° F. This additional treating step increases the complexity and cost of the process.

Other desirable properties of quality coke, e.g., coke used in electrode manufacture, include a low coefficient of thermal expansion and a low tendency to puff or expand during manufacture of the final product, e.g., electrode. Therefore, it would be advantageous to provide a process providing for improved yields of high quality coke.

Therefore, one of the primary objects of the present invention is to provide a process for the production of improved yields of coke.

Another object of the present invention is to provide a process for producing coke having high quality, e.g., a reduced sulfur content.

A still further object of the present invention is to provide a simple process for producing coke having a substantially reduced sulfur content. Other objects and advantages will become apparent hereinafter.

An improved coking process has been discovered which comprises (1) contacting a sulfur-containing hydrocarbon feedstock containing at least 1% by weight Conradson Carbon Residue with at least one peroxy oxidant in the presence of a catalyst comprising a metal in an amount effective to promote the oxidation of sulfur to preferentially oxidize at least a portion of the sulfur contained in the hydrocarbon feedstock; and (2) subjecting the oxidized sulfur-containing hydrocarbon feedstock to coking conditions to form coke and recovering a coke product. Thus, the oxidized sulfur-containing hydrocarbon feedstock is subjected to coking conditions, e.g., preferably at temperatures in the range from about 800° F. to about 1100° F., to produce a coke product from this coking step having a sulfur content reduced by at least about 40% by weight. In other words, the present process yields a coke product which has a sulfur content, i.e., concentration, reduced by at least about 40% by weight relative to the sulfur content of a coke product produced by subjecting the same sulfur-containing hydrocarbon feedstock to step (2) without processing this feedstock in step (1) of the present process. Thus, it has been found that by contacting the sulfur-containing hydrocarbon feedstock as in step (1) of the present invention a coke product having substantially reduced sulfur content, i.e., reduced by at least about 40% by weight relative to a coke product produced from this feedstock which has not been so contacted, is produced in step (2). The present process which utilizes a metal-containing oxidation catalyst gives also improved yields of high quality, e.g., reduced sulfur content, coke which can be used in, for example, manufacturing graphite electrodes.

The various sulfur-containing hydrocarbon feedstocks which can be utilized in the process of this invention include those derived from petroleum sources. In general, the sulfur content of these materials may be greater than about 1% by weight. In many instances, although not necessarily, these hydrocarbon materials containing significant amounts of thiophene sulfur which is known to be difficult to remove. Typical examples of sulfur-containing coker feedstock which are suited to the present process include heavy hydrocarbon materials such as petroleum fractions containing at least a major amount of material boiling above about 550° F., for example, crude petroleum oil, atmospheric and vacuum still residues which contain about 1% by weight or more of sulfur and the like. The process is particularly advantageous when the feedstock is a pumpable sulfur-containing hydrocarbon feedstock which contains at least about 1% by weight Conradson Carbon Residue, preferably at least about 5% by weight Conradson Carbon Residue. Feedstocks containing up to about 40% or more Conradson Carbon Residue are also suited for this process. Typical coker feedstocks include virgin crude, bottoms from the vacuum distillation of reduced crude, thermal tar, furfural extract, vacuum tar, reduced crude, topped crude and mixtures thereof. High aromatic content feedstocks are preferred for coking since they yield a coke that can be processed into a quality graphite. Examples of such feedstock are clarified oils and the refractory cycle stock obtained by thermal and catalytic processes and boiling the gas oil range. Decant oil from fluid catalytic cracking is another example of such high aromatic content feedstocks. Sulfur-containing hydrocarbon materials from tar sands, oil shale and the like are also suited to the present process.

As stated above, thiophene sulfur is particularly difficult to remove. Typical examples of the 2,3,4, and 5 ring thiophene-containing materials found in heavy hydrocarbon materials include benzothiophene, dibenzothiophene, 5-thia-3,4-benzofluorene, tetra-phenyl-thiophene, diacenaphtho (1,2-b,1',2'-d) thiophene and anthra (2,1,9-cde) thianaphthene. The hydrocarbon material may also contain non-thiophene sulfur, various sulfides, and elemental sulfur which can be oxidized by the process of the present invention.

The sulfur in the hydrocarbon material may be oxidized using a peroxy oxidant which is able to chemically oxidize at least a portion, preferably a major portion, of the sulfur contained in the hydrocarbon material. It is preferred that the oxidant preferentially oxidize the sulfur rather than the hydrocarbon portion of the hydrocarbon material. By this is meant that the oxidation preferably occurs without substantial oxidation of carbon atoms to form, for example, ketones, carboxy acids or other carbonyl-containing compounds. Included among the oxidants which may be used for such oxidation are peroxy compounds such as hydrogen peroxide, organic peroxides, organic hydroperoxides and organic peracids, as well as inorganic peroxy compounds such as inorganic peroxides and the like. The organic peroxy compounds are preferred. Mixtures of oxidants may also be used. The sulfur oxidation takes place in the presence of a metal-containing catalyst, described hereinafter.

Thus, the oxidation step is carried out by treating the sulfur-containing hydrocarbon material with a peroxy oxidant in the presence of a metal-containing catalyst for a time sufficient to effect oxidation of at least a portion of the sulfur present in the hydrocarbon material. The concentration of oxidant is usually dependent upon the percent sulfur present in the hydrocarbon material and, in general, the mole ratio of oxidant to sulfur contained in the hydrocarbon material is from about 0.5 to about 10 atoms of active (i.e., reducable) oxygen per atom of sulfur in the hydrocarbon material, preferably from about 1 to about 8 atoms of active oxygen per atom of sulfur and more preferably from about 1.5 atoms to about 4.0 atoms of active oxygen per atom of sulfur. Oxidants useful in the present invention include those having one, two or more atoms of active oxygen per molecule of oxidant.

The temperature utilized in carrying out the oxidation step can vary over a wide range. Preferably, a temperature within the range from about 20° F. to about 450° F. may be employed, although higher and lower temperatures can be utilized. In general, the sulfur-containing hydrocarbon material is heated with the oxidant for a time sufficient to oxidize at least a portion, preferably a major portion, of the contained sulfur, e.g., for a time within the range of from about 5 minutes to about 24 hours, from about 5 minutes to about 10 hours, and more preferably from about 5 minutes to about 2 hours. The time that is utilized, in general, depends upon the percent sulfur present in the heavy hydrocarbon material, the type of sulfur present and the type and amount of oxidant and catalyst, if any, which are present. The sulfur-oxidizing step of this invention, in general, may be carried out over a broad range of pressures, preferably at a pressure in the range from about 1 atmosphere to about 100 atmospheres or more.

The preferred oxidants which are utilized in carrying out the oxidation step of the process of this invention are organic peroxides, organic hydroperoxides, organic peracids and mixtures thereof. These oxidants are particularly preferred, for example, because the use of these oxidants have been found to be selective for oxidation of the sulfur, that is, substantial amounts of carbon oxidation products such as acids and ketones are not formed. In addition, high product yields of quality coke are obtained by practicing the present invention utilizing the preferred oxidants. The organic oxidants include by way of example, hydrocarbon peroxides, hydrocarbon hydroperoxides and hydrocarbon peracids wherein the hydrocarbon radicals in general contain from about 1 to about 30 carbon atoms per active oxygen atom. With respect to the hydrocarbon peroxides and hydrocarbon hydroperoxides, it is particularly preferred that such hydrocarbon radical contain from about 4 to about 18 carbon atoms per active oxygen atom, i.e., per peroxide linkage, and more particularly from 4 to 16 carbon atoms per peroxide linkage. With respect to the hydrocarbon peracids, the hydrocarbon radical is defined as that radical which is attached to the carbonyl carbon and it is preferred that such hydrocarbon radical contain from 1 to about 12 carbon atoms, more preferably from 1 to about 8 carbon atoms, per active oxygen atom. It is intended that the term organic peracid include, by way of definition, performic acid.

In addition, it is contemplated within the scope of this invention that the organic oxidants can be prepared in situ, that is the peroxide, hydroperoxide or peracid can be generated in the sulfur-containing hydrocarbon material and such organic oxidant is contemplated for use within the scope of this invention.

Typical examles of hydrocarbon radicals are alkyl such as methyl, ethyl, butyl, t-butyl, pentyl, n-octyl and those aliphatic radicals which represent the hydrocarbon portion of a middle distillate or kerosene, and the like; cycloalkyl radicals such as cyclopentyl and the like; alkylated cycloalkyl radicals such as mono- and polymethylcyclopentyl radicals and the like; cycloalkyl substituted alkyl radicals such as cyclopenyl methyl and ethyl and the like; aryl and alkyl phenyl substituted alkyl radicals such as benzyl, methylbenzyl, caprylbenzyl, phenylethyl, phenylpropyl, naphthylmethyl, naphthylethyl, and the like; aryl radicals such as xylyl, methyl phenyl, ethyl phenyl and the like.

Typical examples of oxidants are hydroxyheptyl peroxide, cyclohexanone peroxide, t-butyl peracetate, di-t-butyl diperphthalate, t-butyl-perbenzoate, methyl ethyl ketone peroxide, dicumyl peroxide, t-butyl hydroperoxide, di-t-butyl peroxide, p-methane hydroperoxide, pinane hydroperoxide, 2,5-dimethylhexane-2,5-dihydroperoxide, tetrahydronaphthalene hydroperoxide and cumene hydroperoxide as well as organic peracids, such as performic acid, peracetic acid, trichloroperacetic acid, perbenzoic acid and perphthalic acid. The preferred oxidant for use in the present invention is tertiary butyl hydroperoxide.

The catalyst which is utilized to promote the oxidation of sulfur contained in a hydrocarbon material comprise metals selected from Group IV-B, Group V-B, Group VI-B and mixtures thereof. These catalysts can be incorporated into the present process by any means known to those skilled in the art, and can be included in either a homogeneous or heterogeneous catalyst system. When a homogeneous metal-containing oxidation catalyst is employed, it is preferred that the catalyst metal concentration be in the range from about 5 ppm. to about 1.0%, more preferably from about 10 ppm. to about 500 ppm. by weight based on the weight of the sulfur-containing hydrocarbon material. In any event, the catalyst metal concentration is such as to promote the preferential oxidation of sulfur in the sulfur-containing hydrocarbon material. The catalyst can be incorporated by a variety of means and by the use of a variety of carriers. The particular catalyst carrier which is utilized is not critical with respect to the practice of this invention and can be, for example, a support medium or an anion (including complex formation) which is attached to the metal (e.g., a ligand). The preferred catalyst metals are titanium, zirconium, vanadium, tantalum, chromium, molybdenum, tungsten and mixtures thereof, with molybdenum being the more preferred catalyst metal. Illustrative ligands include halides, organic acids, alcoholates, mercaptides, sulfonates and phenolates. These metals may be also bound by a variety of complexing agents including acetonylacetonates, amines, ammonia, carbon monoxide and olefins, among others. The metals may also be introduced in the form of organometallics including "ferrocene" type structures. The various ligands illustrated above which are utilized solely as carriers to incorporate the metal into the process system, in general, have an organic radical attached to a functional group such as the oxygen atom of the carbonyloxy group of the acid, the oxygen of the alcohol, the sulfur of the mercaptan, the

of the sulfonate, the oxygen of the phenolic compound and the nitrogen of the amines. The organic radical attached to the afore described functional groups can be defined as a hydrocarbon radical and, in general, can contain from 1 to about 30 carbon atoms. Typical examples of hydrocarbon radicals are set forth above.

Various covalent peroxide complexes, with or without $\pi$-ligands, or suitable metals are also effective oxidation catalysts. The preferred $\pi$-ligands are hexamethyl phosphoamide, octamethyl phosphonamide, trialkyl-, triaryl,- and triaralkyl-phosphines and phosphine oxides, pyridine oxide, pyridine, 2,2'-bipyridine, dimethylforamide, dimethylacetamide, and tetramethyl-urea.

The metals contained in either the homogeneous or heterogeneous catalyst useful in the present invention can include an individual metal or combination of metals. These metals can be supported on a suitable material, for example, natural or synthetic alumina, silica (or combinations of both) as well as activated clays or carbon, among others. The modes of contacting the hydrocarbon material with a heterogeneous catalyst whereby the catalytic effect may be achieved may include slurry-bed reactions or continous contacting over a stationary phase in a trickle-tube reactor or other conventional methods.

A particularly preferred catalyst for carrying out the oxidation step of the process of this invention is a molybdenum-containing catalyst prepared by a method which comprises interacting molybdenum metal with a compound selected from the group consisting of organic peroxide, organic hydro peroxide, organic peracid, hydrogen peroxide and mixtures thereof in the presence of at least one saturated alcohol having from one to four carbon atoms per molecule to solubilize at least a portion of the molybdenum metal. It is believed that the molybdenum metal interacts with the peroxy compound to form a soluble molybdenum-containing product.

Typical peroxides, hydroperoxides, and peracids useful in the preparation of the preferred molybdenum-containing catalyst have been described previously as oxidants and, therefore, no further exemplification is required. These peroxy compounds may also be substituted with groups such as halides, $-NH_2$, $-SH$,

and the like which do not interfere with the catalyst forming process. The most preferred peroxy compound for use in preparing this molybdenum-containing catalyst is tertiary butyl hydroperoxide.

Hydrogen peroxide suitable for preparing the preferred molybdenum-containing catalyst is preferably used in the form of an aqueous solution containing, for example, from about 10% to about 60%, preferably about 30%, by weight of hydrogen peroxide.

Typical examples of low molecular weight monohydroxy alcohols which are suitable for use in the preparation of the preferred molybdenum-containing catalyst include methyl alcohol, ethyl alcohol, isopropyl alcohol, n-butyl alcohol and tertiary butyl alcohol. The low molecular weight poly-hydroxy alcohols which are suitable include ethylene glycol, propylene glycol, 1,2-butylene glycol and glycerol. In general, either mono- or poly-hydroxy alcohols containing from 1 to 4 carbon atoms per molecule are suitable. In the present invention, it is preferred that the molybdenum metal be interacted with tertiary butyl hydroperoxide in the presence of tertiary butyl alcohol. If tertiary butyl alcohol is used as the saturated alcohol, it is preferred, to enhance molybdenum solubility, that the interaction mixture comprise at least one mono- or poly-hydroxy alcohol having from 1 to about 16 carbon atoms per molecule, at least one primary hydroxy group, and be present in an amount of from about 1% to about 25% by weight of the total alcohol present. A particularly preferred alcohol mixture for use in combination with tertiary butyl alcohol is the stream of higher poly-hydroxy alcohols having a molecular weight in the range from about 200 to about 300 and containing from about 4 to about 6 hydroxy groups derived from propylene epoxidation and described in U.S. Pat. No. 3,573,226.

The relative proportions of peroxy compound and low molecular weight saturated alcohol employed in preparing the catalyst may vary over a broad range and is, therefore, not of critical importance to the invention. Typically, the peroxy compound comprises from about 5% to about 50% by weight of the total peroxy compound and saturated low molecular weight alcohol used in catalyst preparation.

The molybdenum concentration in the catalyst mixture, i.e., the mixture comprising the interaction product of the metallic molybdenum and peroxy compound plus any excess peroxy compound and the low molecular weight alcohol, often may be within the range from about 15 ppm. to about 5.0%, preferably in the range from about 30 ppm. to about 2.0%, by weight of the total mixture. It may be desirable to prepare the catalyst in the presence of a solvent such as benzene, tertiary butyl alcohol, ethyl acetate and the like, in order to obtain the optimum molybdenum concentration in the final catalyst mixture. However, if this type of dilution is desired, it is preferred that an excess of tertiary butyl alcohol be maintained in the catalyst mixture for this purpose.

The molybdenum metal useful in the preparation of the particularly preferred molybdenum-containing catalyst may be in the form of lumps, sheets, foil or powder. The powdered material, e.g., having a particle size such that it passes through a 50 mesh sieve, preferably through a 200 mesh sieve, on the Standard Screen Scale, is preferable because of its lower cost and in addition, it offers the greatest surface area per unit volume and, therefore, the fastest rate of solubilization.

The molybdenum metal-peroxy compound interacting may be carried out at a wide range of temperatures, for example, within the range from about 25° C. to about 150° C. Interacting pressures should be set to avoid extensive vaporization of the peroxy compound and alcohol. Typical interacting pressures may range from about 1 psia. to about 100 psia. In many instances, atmospheric pressure may be used. After the interacting has been carried out for a desired length of time, e.g., from about 5 minutes to about 30 hours, the reaction mass may be filtered to separate the insoluble molybdenum from the catalyst mixture which mixture is thereafter suitable for use as a catalyst for the oxidation of sulfur impurities in hydrocarbon materials.

Following the oxidation step, the oxidized sulfur-containing hydrocarbon feedstock is subjected to coking conditions so as to form coke. The type of coking process system used is not critical to the present invention. Two typical coking processes which can be utilized in the present invention are delayed coking and fluidized coking.

In the delayed coking process, the oxidized sulfur-containing hydrocarbon feedstock is preheated to a coking temperature, generally between about 800° F. to about 1100° F. and preferably between about 850° F. to about 950° F. The preheated feedstock is then fed to the bottom of the delayed coker drum. The coking feed is allowed to soak in its own heat in the delayed coker at a low pressure, generally from about 1 atmosphere to about 10 atmospheres absolute, preferably from about 3 atmospheres and about 7 atmospheres absolute. The cracked vapors are continuously removed overhead so as to recover the distillate fuels while coke is allowed to build up in the drum to successively higher levels. When the drum is filled with coke, the preheated feed is diverted to a succeeding drum and the former drum is steamed out and cooled. The coke is then removed from the cooled drum by conventional means.

In the fluid coking process, the oxidized sulfur-containing hydrocarbon feedstock is contacted with a highly turbulent mass of contact particles maintained at a coking temperature, e.g., from about 800° F. to about 1100° F. preferably from about 950° F. to about 1100° F. The feedstock upon contacting the hot solids is pyrolyzed into vaporous reaction products and carbonaceous residue the latter being deposited as a coating on the contact particles. Conventionally, a portion of the carbon-coated solids are passed to a combustion zone wherein oxidation of the deposited carbon serves to heat the solids to sufficiently high temperatures so as to enable their recirculation to the coking vessel to supply the thermal energy required in the contacting zone.

Suitble contact solids for fluid coking include among others, coke particles, sand, ceramics and the like and range up to about 1000 microns in size, preferably from about 40 to about 500 microns in diameter. The vaporous conversion products, normally having passed through a solids separation step, e.g., a cyclone separator are withdrawn overhead from the coking zone, quenched, and thereafter subjected to rectification in a fractionation unit. A coke product from the fluidized coking process can be recovered by conventional means.

The following examples illustrate clearly the present invention. However, these examples are not to be interpreted as specific limitations on the invention.

EXAMPLE I

This example illustrates the oxidation step of the process of the present invention. A clarified oil sulfur-containing hydrocarbon feedstock gave the following analysis.

| | |
|---|---|
| Weight % Sulfur | 1.81 |
| Nitrogen, ppm. | 1900 |
| Pour Point, ° F. | 65 |

-continued

| | |
|---|---|
| Gravity, ° API | 6.5 |
| Initial Boiling Point | 418° F. |
| 90% Overhead | 915° F. |
| Weight % Conradson Carbon Residue | 5.64 |
| Weight % Sulfur of Conradson Carbon Residue | 1.17 |

A soluble, i.e., homogeneous, oxidation catalyst was prepared by combining 0.74 weight percent molybdenum powder with tertiary butyl hydroperoxide in the presence of tertiary butyl alcohol and a mixture of $C_{10}$ to $C_{15}$ glycols containing from 4 to 6 hydroxyl group per molecule wherein at least one of the hydroxy groups was primary. The weight ratio of tertiary butyl hydroperoxide to tertiary butyl alcohol to glycols was about 2.1:4.1. This combination was heated to reflux temperature with constant stirring and maintained at this temperature until all the molybdenum had dissolved.

Tertiary butyl hydroperoxide was selected as the oxidant to oxidize the sulfur impurities in the hydrocarbon feedstock.

200 grams of this hydrocarbon feedstock was mixed with sufficient catalyst mixture in a 1 (one) liter resin kettle equipped with a stirrer and water cooled condenser to give about 120 parts per million by weight of molybdenum in the hydrocarbon feedstock. A 41% by weight tertiary butyl hydroperoxide in tertiary butyl alcohol solution was added at a rate of about 0.8 moles tertiary butyl hydroperoxide per hour such that the overall mole ratio of the tertiary butyl hydroperoxide to sulfur was about 3.0. The mixture thus formed was heated to a temperature of about 80° C. and maintained at this temperature for 4 hours. This temperature caused the mixture to reflux. After this time, the reaction mixture was cooled and tertiary butyl alcohol and unreacted tertiary butyl hydroperoxide were removed by water washing until a water fraction gave a negative potassium iodide test for hydroperoxide. A sample of the oxidized sulfur-containing hydrocarbon material gave the following analysis.

| | Weight %* |
|---|---|
| Sulfur | 1.63 |
| Carbon | 87.31 |
| Hydrogen | 7.77 |
| Oxygen | 1.52 |
| Weight % Conradson Carbon Residue | 14.30 |
| Weight % Sulfur Conradson Carbon Residue | .40 |

*The proportions listed here result from a series of independent chemical analyses and, therefore, the sum of the weight percents is slightly in excess of 100.

EXAMPLE II

This example further illustrates the oxidation step of the present invention.

The hydrocarbon feedstock employed was a benzene soluble petroleum vacuum still residuum (Initial Boiling Point — 610° F., 15% overhead—962° F.) having the following composition:

| | Weight %* |
|---|---|
| Sulfur | 3.13 |
| Nitrogen | 0.45 |
| Carbon | 85.38 |

-continued

| | Weight %* |
|---|---|
| Hydrogen | 10.43 |
| Oxygen | 0.83 |
| Weight % Conradson Carbon Residue | 17.85 |
| Weight % Sulfur Conradson Carbon Residue | 4.74 |

*The proportions listed here result from a series of independent chemical analyses and, therefore, the sum of the weight percents is slightly in excess of 100.

The hydrocarbon feedstock was oxidized in a manner similar to that given in Example I. A sample of the resulting oxidized sulfur-containing hydrocarbon feedstock was analyzed and gave the following results.

| | |
|---|---|
| Weight % Conradson Residue | 27.85 |
| Weight % Sulfur Conradson Carbon Residue | 2.80 |

EXAMPLES III AND IV

These examples illustrate the coking step of the process of the present invention.

The oxidized sulfur-containing hydrocarbon products from Examples I and II are preheated to a coking temperature of about 900° F. Each preheated feedstock is then continuously fed into the bottom of a vessel where it is allowed to soak in its own heat at a pressure of about 40 psig. The vaporous material is continuously removed from the vessel while coke which remains in the vessel is allowed to build up. The coke product is recovered from the vessel using conventional techniques. This coke is produced in improved yields and has other outstanding properties, e.g., reduced sulfur content.

EXAMPLE V

This example further illustrates the coking step of the process of the present invention.

An oxidized sulfur-containing hydrocarbon material produced as in Example I was subjected to a batch coking operation designed to simulate a commercial delayed coking process and known to give a good correlation with commercial operation with respect to coke yield and quality. A coke product was recovered using conventional techniques and evaluated for quality. It was determined that this coke was of high quality, e.g., low sulfur content, low coefficient of thermal expansion and tendency to puff, so that this material may be used in the manufacture of graphite electrodes.

The above examples illustrate that the process of the present invention can provide significantly improved yields of coke. It is well known that Conradson Carbon Residue can be correlated with coke making for various feedstocks to determine relative coke yields. In Example I, the Conradson Carbon Residue of the oxidized sulfur-containing hydrocarbon feedstock was more than 250% greater than that of the non-oxidized feedstock thus clearly indicated that the process of the present invention can result in improved coke yields.

In addition, the present invention provides a high quality coke product, e.g., coke having reduced sulfur content. Impurity levels in Conradson Carbon residues from various feedstocks may be used to compare the relative level of impurities in coke produced from these same feedstocks. In Examples I and II, the sulfur concentrations in the Conradson Carbon Residues from the oxidized feedstocks were only about 34% and 59% by weight, respectively, of the sulfur concentrations of the Conradson Carbon Residues from the non-oxidized feedstocks. In other words, these Examples illustrate that the coke product produced from a feedstock according to the present invention has a sulfur content reduced by at least about 40% by weight relative to a coke product produced from this same feedstock without the present oxidation step. Further, the present reduced sulfur coke product is obtained without requiring that the coke product be treated at temperatures from 1200° F. to 1600° F. Clearly, the process of the present invention can provide increased yields of coke having substantially reduced sulfur content. In addition, as shown by Example V, coke produced according to the present invention may be utilized in the manufacture of graphite electrodes. This is yet another indication of the high quality of the coke product of the present invention.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A process for producing coke which comprises:
   1. contacting a sulfur containing hydrocarbon feedstock containing at least 1% by weight Conradson Carbon Residue with at least one peroxy oxidant in the presence of a catalyst comprising a metal in an amount effective to promote the oxidation of sulfur to preferentially oxidize at least a portion of the sulfur contained in said hydrocarbon feedstock, said metal being selected from the group consisting of Group IVB, Group V, Group VI and mixtures thereof;
   2. subjecting said oxidized sulfur-containing hydrocarbon feedstock to coking conditions at temperatures in the range from about 800° F. to about 1100° F. to produce a coke product from said coking having a sulfur content reduced by at least 40% by weight relative to the sulfur content of a coke product produced by subjecting the feedstock to the coking conditions of step 2 without the oxidation of step 1.

2. The process of claim 1 wherein at least a major amount of said sulfur containing hydrocarbon feedstock boils above about 550° F.

3. The process of claim 2 wherein step 1 comprises contacting said feedstock with from about 0.5 atoms to about 10 atoms of active oxygen per atom of sulfur present to preferentially oxidize at least a portion of sulfur-containing in said hydrocarbon feedstock said active oxygen being in the form of an oxidant selected from the group consisting of organic peroxides, organic hydroperoxides, organic peracids and mixtures thereof.

4. The process of claim 3 wherein said oxidant is selected from the group consisting of organic peroxides, organic hydroperoxides, organic peracids and mixtures thereof containing from 1 to about 30 carbon per active oxygen atom.

5. The process of claim 4 wherein said metal is selected from the group consisting of titanium, zirconium, chromium, molybdenum, tungsten and mixtures thereof and is present in an amount from about 5 ppm. to about 1.0% by weight of said hydrocarbon feedstock.

6. The process of claim 5 wherein said metal is molybdenum.

7. The process of claim 6 wherein said catalyst is prepared by a method which comprises interacting molybdenum metal with a compound selected from the group consisting of organic hydroperoxide, organic peroxide, organic peracid, hydrogen peroxide and mixtures thereof in the presence of at least one saturated alcohol having from 1 to 4 carbon atoms per molecule at conditions such that at least a portion of said molybdenum is solubilized.

8. The process of claim 7 wherein said interacting occurs at a temperature in the range from about 25° C. to about 150° C.

9. The process of claim 8 wherein said catalyst is prepared by a method which comprises interacting molybdenum metal with tertiary butyl hydroperoxide in the presence of tertiary butyl alcohol and at least one mono- or poly- hydroxy alcohol having from 1 to about 16 carbon atoms per molecule and at least one primary hydroxy group present in an amount sufficient to enhance molybdenum solubility.

10. The process of claim 8 wherein step (2) is carried out utilizing a fluid coking process.

11. The process of claim 9 wherein step (2) is carried out utilizing a delayed coking process.